United States Patent [19]

Fykse et al.

[11] Patent Number: 5,071,079
[45] Date of Patent: Dec. 10, 1991

[54] DEVICE FOR CHOPPING-UP BULK MATERIAL

[75] Inventors: Njaal Fykse; Jon Boe; Erling Royneberg, all of Naerbo, Norway

[73] Assignee: Underhaug AS, Naerbo, Norway

[21] Appl. No.: 687,077

[22] Filed: Apr. 16, 1991

Related U.S. Application Data

[63] Continuation of Ser. No. 442,594, Nov. 29, 1989, abandoned.

[30] Foreign Application Priority Data

Dec. 1, 1988 [GB] United Kingdom ............... 8828048
Apr. 28, 1989 [GB] United Kingdom ............... 8909782
Sep. 18, 1989 [GB] United Kingdom ............... 8921118

[51] Int. Cl.$^5$ ............................................. B02C 21/02
[52] U.S. Cl. ............................. 241/101 A; 241/101.7;
241/186.4; 241/222; 241/243
[58] Field of Search ............ 241/101 A, 101.7, 189 R,
241/186 R, 186.4, 223, 222, 294, 243, 186.2

[56] References Cited

U.S. PATENT DOCUMENTS

| 2,685,900 | 8/1954 | Cross | 241/101 A |
| 3,208,491 | 9/1965 | Bliss . | |
| 4,134,554 | 1/1979 | Morlock | 241/186 R X |
| 4,195,958 | 4/1980 | Vahlkamp et al. | 241/101 A X |
| 4,412,659 | 11/1983 | Crawford et al. | 241/186.2 X |
| 4,485,976 | 12/1984 | White | 241/186.4 X |
| 4,524,916 | 6/1985 | Keyes et al. | 241/101 A |
| 4,830,292 | 5/1989 | Frey | 241/101 A |

FOREIGN PATENT DOCUMENTS

| 77913 | 8/1976 | Australia . | |
| 134212 | 10/1976 | Denmark . | |
| 2749256 | 10/1978 | Fed. Rep. of Germany . | |
| 2522472 | 9/1983 | France . | |
| 2524253 | 10/1983 | France . | |
| 2560739 | 9/1985 | France | 241/101 A |
| 2561490 | 9/1985 | France . | |
| WO87/05186 | 9/1987 | PCT Int'l Appl. . | |
| 2101882 | 1/1913 | United Kingdom . | |
| 2116834 | 10/1983 | United Kingdom . | |
| 2180143 | 3/1987 | United Kingdom | 241/101 A |

Primary Examiner—Mark Rosenbaum
Attorney, Agent, or Firm—Merchant & Gould Smith, Edell, Welter & Schmidt

[57] ABSTRACT

There is disclosed a device for chopping-up bulk material and particularly long stem animal feed material and which comprises: a frame; an elongate cutter body mounted in said frame for rotation about a substantially horizontal axis; cutter blades mounted on the outer periphery of the cutter body; an elongate housing extending partly around said cutter body, said housing defining an inlet which extends substantially throughout the length of the cutter body to admit bulk material to be chopped and an outlet for discharging chopped up material after treatment by the blades of the rotating cutter body; a feeder device arranged on the frame and operable to support and to feed the bulk material to the housing inlet; and, a grill arranged at the inlet so as to control the supply of material to the cutter body. The grill comprises an arrangement of grill bars which are spaced apart so as to define spaces through which the cutter blades 14 can move during rotation of the cutter body, said grill bars and said cutter body being relatively adjustable so as to permit variation in the extent by which the cutter blades project beyond the grill bars during rotation of the cutter body, so that the device can be readily adjusted to treat different types of bulk material.

27 Claims, 12 Drawing Sheets

DEVICE FOR CHOPPING-UP BULK MATERIAL

This is a continuation of application Ser. No. 07/442,594, filed Nov. 29, 1989 now abandoned.

This invention relates generally to a device for chopping-up bulk material, and in particular to a device for chopping long stem material into short lengths such as long stem animal feed material, to render the chopped material suitable for feeding to farm animals, and especially cattle.

The types of long stem material with which the device of the invention is particularly concerned are hay, straw, ammonium treated straw, and silage, and which are usually stored in tightly packed bales. The device of the invention is particularly suitable for chopping densely packed "round bales" into short lengths of material for consumption by cattle, but it should be understood that the invention is not restricted to use on round, or indeed rectangular bales, and is applicable to the chopping of long stem material supplied to the device in other forms, and including supply in relatively loose form.

It is known to provide a chopper device for treating large round bales of straw and hay (see for example WO87/05186, and which comprises an endless conveyor which is arranged to support a lower part of a round bale with its axis substantially horizontal, and a horizontal rotary chopper having radially projecting knives or blades and which rotates at high speed so as to cut the long stems of the bale material into short lengths as the bale is fed into the path of the rotating blades. The endless conveyor is capable of imparting a rotating motion to the bale while at the same time urging the bale towards the rotary chopper, and this functions generally satisfactorily with bales having a relatively high proportion of dry matter content (say upwards of 50% by weight). In the known device, a fixed grill is arranged in the feedpath to the rotary chopper, and takes the form of individual horizontally spaced grill bars which each extend upwardly from a rigid connection with a horizontal anvil bar which co-operates with the chopper blade. The blades project radially through the spaces defined between the grill bars, and therefore while the bulk of the bale is held back by the grill bars from coming too close to the rotary chopper, the tips of the rotating blades are able to engage the outer periphery of the bale and thereby peel an outer layer therefrom as the bale rotates. This peeled-off layer is then drawn through the spaces between the grill bars, and the long stem components of the outer layer are then subjected to high speed cutting action by the rotating blades, between the blade edges and the guide bars and between the blade tips and the anvil bar.

As indicated above, this known device functions generally satisfactorily with long stem material which has a relatively high dry matter content, such as untreated baled straw, dried hay, or silage produced in hot and dry climates. However, in the treatment of long stem material having a higher moisture content i.e. lower dry material content, such as ammonium treated straw, or silage produced in, for example, Great Britain, and the more northerly European areas, it has been found that the known device is not always able to chop the long stem material into the required short lengths in an efficient and reliable manner.

Thus, bales of silage derived from densely packed round bales of cut grass which have been tightly wrapped with plastics film tend to loose their shape and rigidity, by virtue of the changes which the grass undergoes as it matures to form silage, and therefore controlled peeling-off of successive layers of the silage by the chopper knives is often no longer possible. This can result in substantially uncontrolled tearing of the material from the outer surface of the somewhat amorphous bale, and this material (which is usually heavily moisture-laden) is liable to pass straight through to the chopper outlet substantially without being chopped by the chopper blades. This is wasteful of an otherwise valuable animal feed material, since long stem material is generally not consumed properly by cattle, and tends to become dispersed amongst the usual straw or other bedding material of the cattle.

Also, by providing fixed grill bars which extend upwardly as a rigid assembly i.e. non-adjustable from the anvil bar, some of the necessarily somewhat wet silage tends to become lodged at the base of the grill bars and this builds up and interferes with efficient chopping of the silage as it is pulled from the bale and into the path of action of the chopper blades. This therefore requires the operation of the device to be stopped so that the clogged material can be removed, or for the operation of the rotary chopper and the endless conveyor to be reversed, before silage chopping can be resumed.

In addition, the known device is not well able to carry out efficient chopping of long stem material which is supplied in non-baled form e.g. as an irregular supply of loose material.

The invention has therefore been developed primarily with a view to improve the existing rotary chopper device, so as to render it better able to carry out efficient chopping of long stem animal feed material which is supplied in a relatively wet state e.g. with a dry matter content of 20% or less by weight, and/or is supplied in non-baled form.

According to one aspect of the invention there is provided a device for chopping-up bulk material and comprising:

a frame;

an elongate cutter body mounted in said frame for rotation about a substantially horizontal axis;

cutter blades mounted on the outer periphery of the cutter body;

an elongate housing extending partly around said cutter body, said housing defining an inlet which extends substantially throughout the length of the cutter body to admit bulk material to be chopped and an outlet for discharging chopped-up material after treatment by the blades of the rotating cutter body;

a feeder device arranged on the frame and operable to support and to feed the bulk material to the housing inlet; and, a grill arranged at said inlet so as to control the supply of bulk material to the cutter body;

in which the grill comprises an arrangement of grill bars which are spaced apart so as to define spaces through which the cutter blades can move during rotation of the cutter body, said grill bars and said cutter body being relatively adjustable so as to permit variation in the extent by which the cutter blades project beyond the grill bars during rotation of the cutter body.

Thus, by virtue of the arrangement permitting relative adjustment between the grill bars and the cutter body, the chopper device of this one aspect of the invention can be adjusted readily to operate in the most suitable manner with different types of bulk material e.g. long stem material, since some supplies may be conveyed more efficiently to be acted upon by the cutter blades when the blades project radially outwardly of the cutter body and a substantial distance beyond the grill bars, whereas other supplies may receive more efficient treatment when the cutter blades project only a small distance beyond the grill bars so as to make a relatively shallow engagement into the mass of material being fed to the housing inlet.

Preferably, the cutter blades are pivotally mounted at suitable locations throughout the outer periphery of the cutter body, and therefore extend substantially radially of the axis of rotation of the cutter body under the action of centrifugal force during rotation of the cutter body. By virtue of this pivotal mounting of the cutter blades, if any serious obstruction takes place within the housing, the cutter blades engaging such obstruction can pivot on their mountings rather than causing the rotation of the cutter body to be suddenly arrested with consequent risk of damage to the component parts.

Preferably, the axis of the cutter body is fixed, and the grill bars are adjustable.

Conveniently, the grill bars form a unitary assembly which is bodily movable between different positions of adjustment relative to the housing inlet, and the assembly may be coupled with a driving device which can be operated as required by an operator while the chopping device is carrying out a chopping operation. Thus, during operation on any particular mass of material, sometimes it may be necessary to increase the extent of "bite" of the cutter blades into the mass, and other times it may be better to decrease the "bite".

The grill bar assembly may take the form of a plurality of curved fingers which extend downwardly from an upper edge of the housing inlet, and which are arranged to define a clearance between their lower ends and a guide portion of the housing which extends below the cutter body and towards the outlet. This clearance helps to reduce the risk of material becoming clogged at the inlet to the housing.

Preferably, the feeder device takes the form of an arrangement of feed rollers which can support a mass of material requiring chopping, and which are driven so as to convey the material towards the grill bars where the material is then held while being engaged by the cutter blades.

The device can operate with long stem material supplied in loose form onto the feed rollers, but preferably the rollers are arranged to define a generally curved support surface onto which the lower part of a round bale can be supported and, upon driven rotation of the rollers, the bale can be caused to rotate about its axis while having its outer layer engaged by the cutter blades. This enables successive layers to be peeled-off by the tips of the blades which project beyond the grill bars, and then conveyed into the housing so as to be chopped into small lengths under the chopping action of the blades between the blade edges and the guide bars and also between the blade tips and a co-operating anvil bar which may be provided.

A bale pressing device may be mounted on the frame to engage the bale above the housing and to be operated when required e.g. when a sensor detects a potentially blocked condition to impart a periodic pushing action on the bale tending to move the bale away from the grill bars. This may be useful in order to prevent clogging of the inlet, if there is a tendency for unduly large amounts of material to be peeled-off the bale periphery. By temporarily displacing the bale away from the grill bars, this enables any excess material to be drawn through the spaces between the grill bars and to undergo chopping action by the cutter blades, before the bale periphery is returned into renewed engagement with the grill bars under the action of the feeding rollers, and a fresh layer is peeled-off the bale by the renewed engagement of the tips of the cutter blades with the bale periphery.

The pressing device may take the form of a roller carried by a swing arm, and may have teeth, axial blades, or other projections to engage the bale periphery and facilitate its rotation. The swing arm may be driven by an eccentric drive or equivalent, which can cause the swing arm to carry out periodic angular reciprocation. Alternatively, or in addition, the roller carried by the swing arm may itself be eccentrically mounted, so that it also can impart an intermittent pushing action on the adjacent outer periphery of the bale.

It is not essential, however, for the pressing device to apply an intermittent pushing action on the bale, and it may comprise a circular cross-section roller rotating about a fixed central axis, in which case it merely facilitates the rotation of the bale.

According to a further aspect of the invention there is provided a device for chopping long stem animal feed material into short lengths and comprising:

a frame;

an elongate cutter body mounted in said frame for rotation about a substantially horizontal axis;

cutter blades mounted on the outer periphery of the cutter body;

an elongate housing extending partly around said cutter body and defining an inlet which extends substantially throughout the length of the cutter body to admit feed material to be chopped and also having an outlet for discharging chopped-up material after treatment by the blades of the rotating cutter body;

a feeder device arranged on the frame and operable to support a mass of material to be chopped and to feed said mass towards the housing inlet;

a grill arranged at said inlet in the path of the material fed by the feeder device to the inlet, so as to control the supply of material to the cutter body; and, a pusher device mounted above the housing and operable to engage an upper region of the mass of material, the pusher device being arranged to apply either one, or both, of (i) a pushing action when required on the upper region of the mass of material tending to displace it in a direction away from the grill and (ii) to move so as to remain in contact with the upper region of the mass of material as the latter diminishes in size during treatment by the cutter blades of the cutter body.

Therefore, in a device according to the further aspect of the invention, the pusher device assists in controlling the feeding of the mass of material to the grill bars, so as to ensure as far as possible that excessive amounts of material are not drawn into the housing by the cutter blade, and thereby reducing the risk of improperly chopped material issuing from the housing outlet.

The pusher device may comprise a roller mounted on a swing arm which is capable of rocking about a pivot so as to apply an intermittent pushing action on the upper region of the mass of material. The roller itself may have an eccentric mounting, so that it also applies an intermittent or pulsating action on the mass of material.

Alternatively, or in addition, the swing arm may be biased angularly about its pivot in a direction towards the mass of material e.g. by a spring or under hydraulic action, so that it maintains a substantially constant pressing action on the upper surface of the mass of material, as the mass of material dimenishes in size by virtue of progressively increased amounts of material being drawn from the mass by the rotating cutter blades.

Advantageously, the grill in the device of the further aspect of the invention is formed by an arrangement of grill bars which are spaced apart so as to define spaces through which the cutter blades can move during rotation of the cutter body, said grill bars being adjustable so as to permit variation in the extent by which the cutter blades project beyond the grill bars during rotation of the cutter body.

A chopping device according to either aspect of the invention may operate satisfactorily in order to chop-up long stem animal feed material supplied thereto in differently assembled masses, such as in bale form or as loose material. Other bulk materials also may be chopped-up up using the chopping device of the invention. In the case of bales, these will usually be tightly packed bales of material, which may be rectangular, but preferably are round bales rotatable about substantially horizontal axes when supported by the feeder rollers.

Embodiments of chopping device according to the invention will now be described in detail, by way of example only, with reference to the accompanying drawings, in which.

Figure 1:
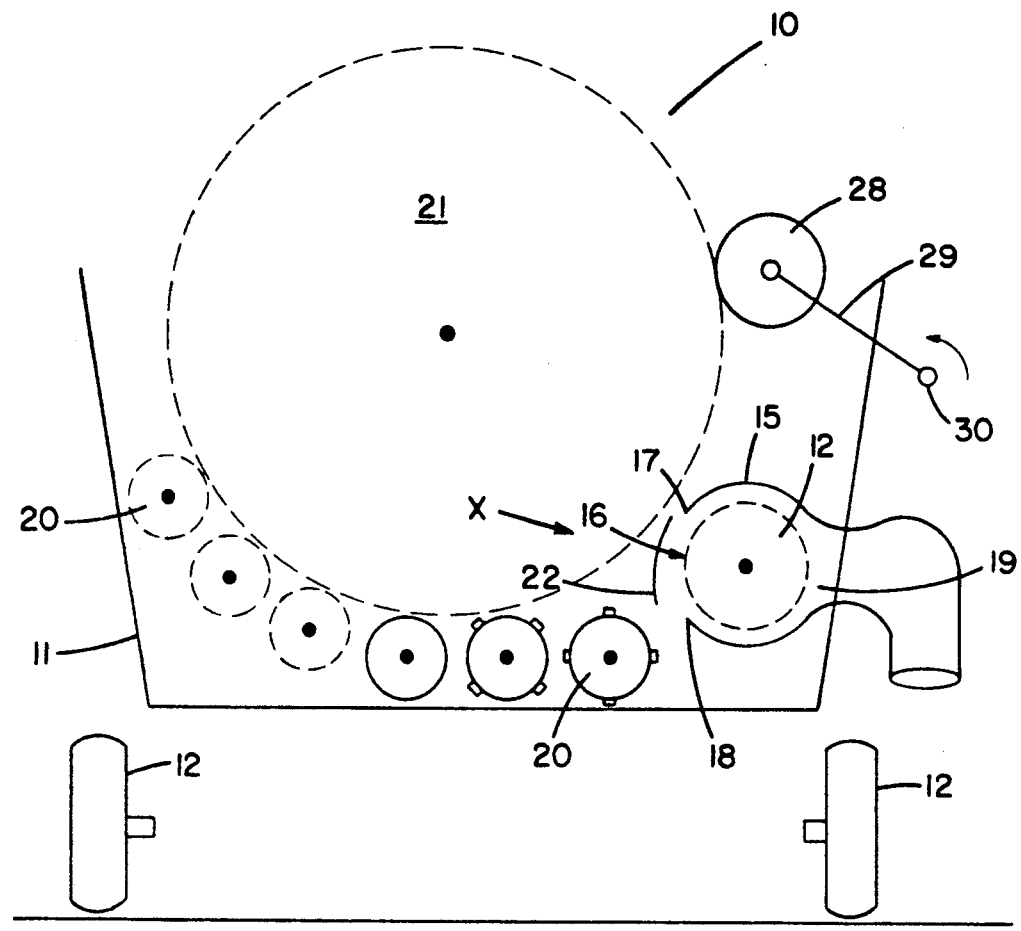
FIG. 1 is a schematic end view of a chopping device according to the invention in the form of a towable trailer.

Referring first to FIGS. 1 to 4 of the drawings, there is shown an embodiment of chopping device according to the invention which is operable to chop bulk material in the form of long stem animal feed material into short lengths suitable for feeding to farm animals, and especially to cattle. The device is designated generally by reference 10 and comprises a frame 11 supported by wheels 12a and provided with a drawbar (not shown) to enable the device to be coupled-up as a trailer to a tractor or other towing vehicle, which also serves as a power source for driving the operating components of the device 10 by any suitable means, including power derived from the power take-off shaft of the tractor, and flexible hydraulic hoses connected to the hydraulic pressure circuit of the tractor.

An elongate cutter body 12 is mounted in the frame 11 for rotation about a substantially horizontal axis 13, and is provided with cutter blades 14 which are pivotally mounted on the outer periphery of the cutter body 13. An elongate housing 15 extends partly around the cutter body 12, and defines an inlet 16 between upper and lower horizontal edges 17 and 18 respectively of the housing 15, and which extends substantially throughout the length of the cutter body 12 to admit feed material to be chopped. The housing 15 also defines an outlet 19 for discharging chopped-up material after treatment by the blades 14 of the rotating cutter body 12.

A feeder device is arranged on the frame 11 and takes the form of a succession of adjacent drive rollers 20 which are operable to support and to feed a mass of animal feed material to the housing inlet 16. In the illustrated arrangement, the mass of animal feed material takes the form of a densely packed round bale 21, though it should be understood that the device of the invention is capable of chopping-up long stem animal feed material in other forms, including rectangular bales, or even as loose material introduced into the device 10 to be supported by the rollers 20.

A grill (shown schematically and designated by reference 22 in FIG. 1) is arranged at the inlet 16 so as to control the supply of material to be engaged and acted upon by the cutter blades 14 of the cutter body 12. As shown in FIG. 2, the grill 21 comprises a unitary assembly of grill bars 23 which are horizontally spaced apart so as to define spaces 24 through which the cutter blades 14 can move during rotation of the cutter body 12. The grill bars 23 take the form of curved depending fingers which are rigidly held at their upper ends 25, and which extend downwardly therefrom to their free ends 26.

Means is provided to permit relative adjustment between the cutter body 12 and the grill 22. In the illustrated embodiments, the unitary assembly of grill bars 23 is adjustable as a whole, by being pivoted about a pivot axis under any suitable power drive, such as a piston cylinder unit, and this enables the grill bars 23 to be adjusted in such a way as to permit variation in the extent by which the cutter blades 14 project beyond the grill bars 23 during rotation of the cutter body 12. The radial projection of the cutter blades 14 from the axis 13 of the cutter body 12 and beyond the grill bars 23 is shown in FIG. 3, as well as a pivot axis 27 about which the grill bars 23 are pivotable.

By virtue of the facility for adjustment of the grill bars 23, the chopper device 10 can be adjusted readily to operate in the most suitable manner with different types of supply of long stem material. Thus, some supplies may be conveyed more efficiently to the inlet 16 to be acted upon by the cutter blades 14 when the blades 14 project a substantial distance beyond the grill bars 23, as shown in FIG. 3, whereas other supplies of the material may receive more efficient treatment when the cutter blades 14 project only a small distance beyond the grill bars 23 so as to make a relatively shallow engagement into the mass of material being fed to the housing inlet 16.

Figure 3:
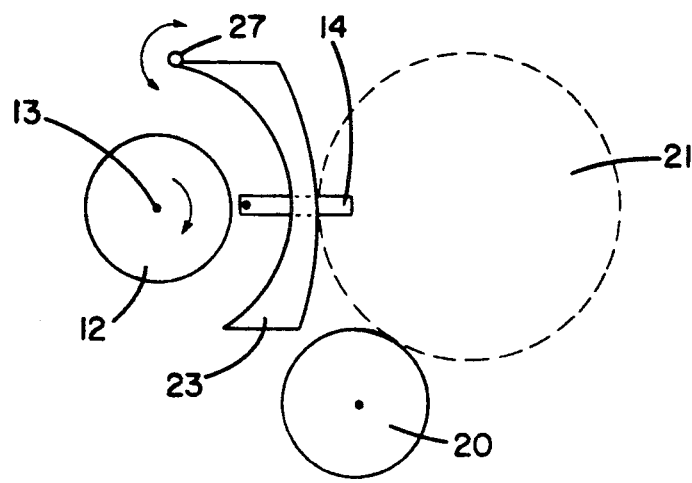
FIG. 3 is a schematic view, to an enlarged scale, illustrating the manner by which a mass of long stem animal feed material is fed against a grill provided at the inlet to a housing in which a rotary cutter is mounted.

As can be seen from FIG. 3, the cutter blades 14 are pivotally mounted on the outer periphery of the cutter body 12, and therefore they can extend substantially radially of the axis of rotation 13 under the action of centrifugal force during rotation of the cutter body. By this arrangement, if any serious obstruction takes place within the housing 15, the cutter blades 14 engaging such obstruction can pivot on their mountings, rather than causing the rotation of the cutter body 12 to be suddenly arrested with consequent risk of damage to the component parts.

By providing a unitary assembly of grill bars 23 which can be bodily moved between different positions of adjustment relative to the housing inlet 16, the assembly can be coupled with a hydraulically operated adjusting device which can be operated by the driver of a tractor coupled with the device 10, while the device is carrying out a chopping operation, so as to improve the operation of the device. Thus, it can happen that during operation on any particular mass of material, sometimes it may be necessary to increase the extent of "bite" of the cutter blades 14 into the mass of material, whereas at other times it may be better to decrease the "bite".

The curved finger arrangement of the grill bars 23 form a barrier against which the outer periphery of the mass of material e.g. the outer periphery of bale 21 can be pressed, and the projecting blades 14 then engage into the outer periphery and peel-off an outer layer which is drawn into the housing 15 to undergo chopping action from the blades 14 against a lower anvil bar (not shown), by a chopping action between the tips of the blades and the anvil bar. In addition, the long stem material can be chopped by chopping action between the side edges of the blades and the edges of the grill bars 23.

The lower free ends 26 of the grill bars 23 define a clearance with the lower edge 18 of the housing 15, and this minimise the risk of material becoming clogged at the inlet to the housing.

Figure 2:
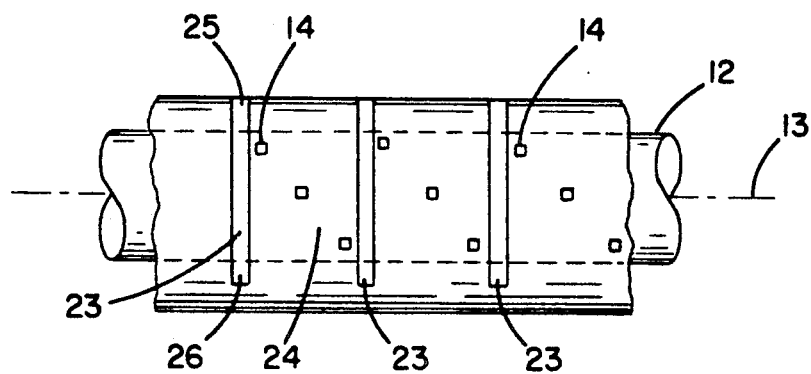
FIG. 2 is a detailed view taken in the direction of the arrow X in FIG. 1.

A bale pressing device is mounted on the frame 11, and takes the form of a roller 28 carried by a swing arm 29 pivotally mounted on the frame 11 via pivot 30 (see FIG. 1). The bale pressing device is therefore able to engage the bale 21, or any mass of material, above the housing 15, and can be operated when required e.g. when a sensor (not shown) detects a potentially blocked condition to impart a periodic pushing action on the bale tending to move the bale away from the grill bars 23. This may be useful in order to prevent clogging of the inlet 16, if there is a tendency for excessive amounts of material to be peeled-off the bale periphery. By temporarily displacing the bale 21 in a direction away from the grill bars 23, this enables any excess material to be drawn through the spaces 24 between the grill bars and to undergo chopping action by the cutter blades 14 before the bale periphery is returned into renewed engagement with the grill bars under the action of the feeding rollers 20, so that a fresh layer can then be peeled-off the bale by the renewed engagement of the tips of the cutter blades 14 with the bale periphery.

The roller 28 may have teeth, axial blades or other projections to engage the bale periphery, and to facilitate its rotation. The swing arm 29 may be driven by an eccentric drive or equivalent, which can cause the swing arm to carry out periodic angular reciprocation. Alternatively, or in addition, the roller 28 may itself be eccentrically mounted, so that it can also impart an intermittent pushing action on the adjacent outer periphery of the bale.

However, and as shown in FIG. 1, the roller 28 may comprise a circular cross-section roller rotating about a fixed central axis, in which case it merely facilitates rotation of the bale.

Figure 4:
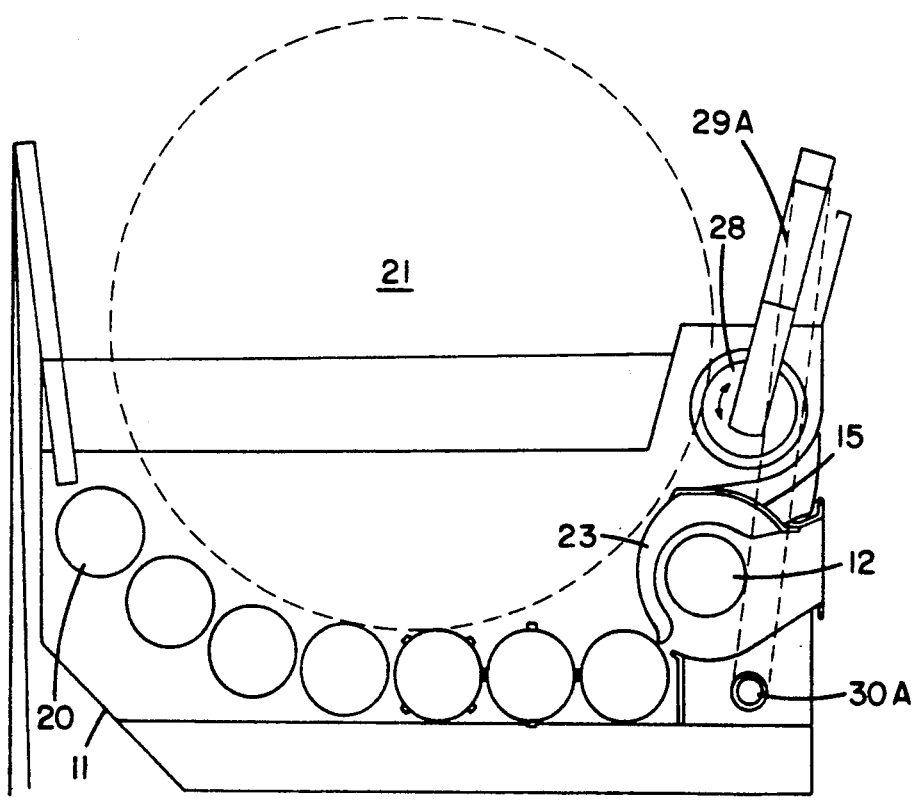
FIG. 4 is a schematic view, to a larger scale, of the components shown in FIG. 1.

FIGS. 1 to 3 show schematically the operating components of the chopper device 10, and FIG. 4 shows in more detail, and to an enlarged scale, a practical construction of an embodiment of the invention, in which corresponding parts are designated by the same reference numerals. In the arrangement shown in FIG. 4, the pressing roller 28 is provided at the lower end of a carrying arm 29a which forms part of a linkage assembly which is pivotable as a whole about a pivot axis 30a arranged below the housing 15.

The pusher device, shown by references 28, 29 and 28a and 29a, is mounted above the housing 15 and is operable to engage an upper region of any mass of material e.g. bale 21, so as to control the feeding of material in a substantially uniform manner to be presented against the grill bars 23. The pusher device is arranged so as to be capable of applying either one, or both, of (i) an intermittent pushing action on the upper region of the mass of material tending to displace it in a direction away from the grill 22 and (ii) to move under spring, hydraulic or other biasing (not shown) so as to remain in contact with the upper region of the mass of material as the latter diminishes in size during treatment by the cutter blades 14 of the cutter body 12.

Referring now to FIGS. 5 to 11, there is shown a modified embodiment of round-bale chopper device according to the invention, and in which parts corresponding with those already described with reference to the first embodiment are designated by similar reference numerals, but with the addition of 100. This further embodiment is therefore designated generally by reference 110, and has differences in the construction and arrangement of elongate cutter body 112, adjustable grill 122 (see FIG. 5) which is formed by longitudinally spaced grill bars 123 (see FIG. 10), and a novel arrangement of flail-type cutter blades 114 (see FIGS. 7, 8 and 10).

Feeder rolls 120 serve to feed and to rotate a densely packed round bale 121 of hay, straw or silage to an inlet to housing 115, in front of which is arranged the longitudinally spaced set of grill bars 123. However, unlike the first embodiment, a feed roll 140 is arranged adjacent to feed roller 120a at the downstream end of the set of feed rollers, and immediately adjacent to the entrance mouth of the housing 115, so as to co-operate with the grill 122, and particularly the rotating cutter blades 114. The construction of feed roller 140 is shown in more detail in FIGS. 6 and 11. It thus can be seen that feed roller 140 is provided with a series of circumferentially spaced toothed projections 141 which assist in the feeding of the rotating mass of bale material 121, and it will be noted from the drawings that the projections 141 take the form of gear-teeth type projections which are angled slightly forwardly with respect to the direction of rotation 142. This can be seen more clearly from FIG. 11, in which leading edge 142 of one projection is inclined at 30° to a radial plane 144 which passes through the axis 145 of the roller, and a trailing edge 143 which is inclined at 60° to radial plane 144. This tooth profile has been found to be useful in promoting smooth feeding of the rotating mass of bale material towards the rotating cutter body 112, in that the projections 141 can engage aggressively or "bite" into the material during traverse over the upper half of its path of movement, but after each projection passes beyond a horizontal plane passing through axis 145, the tooth profile is such as to permit ready discharge of the pieces of bale material therefrom, and this tendency will further increase as the projection tooth passes along its lower path. This therefore minimises the risk of bale material (which does not undergo full engagement or chopping by the blades 114) from passing along the underside of the feed roller 140.

Figure 6:
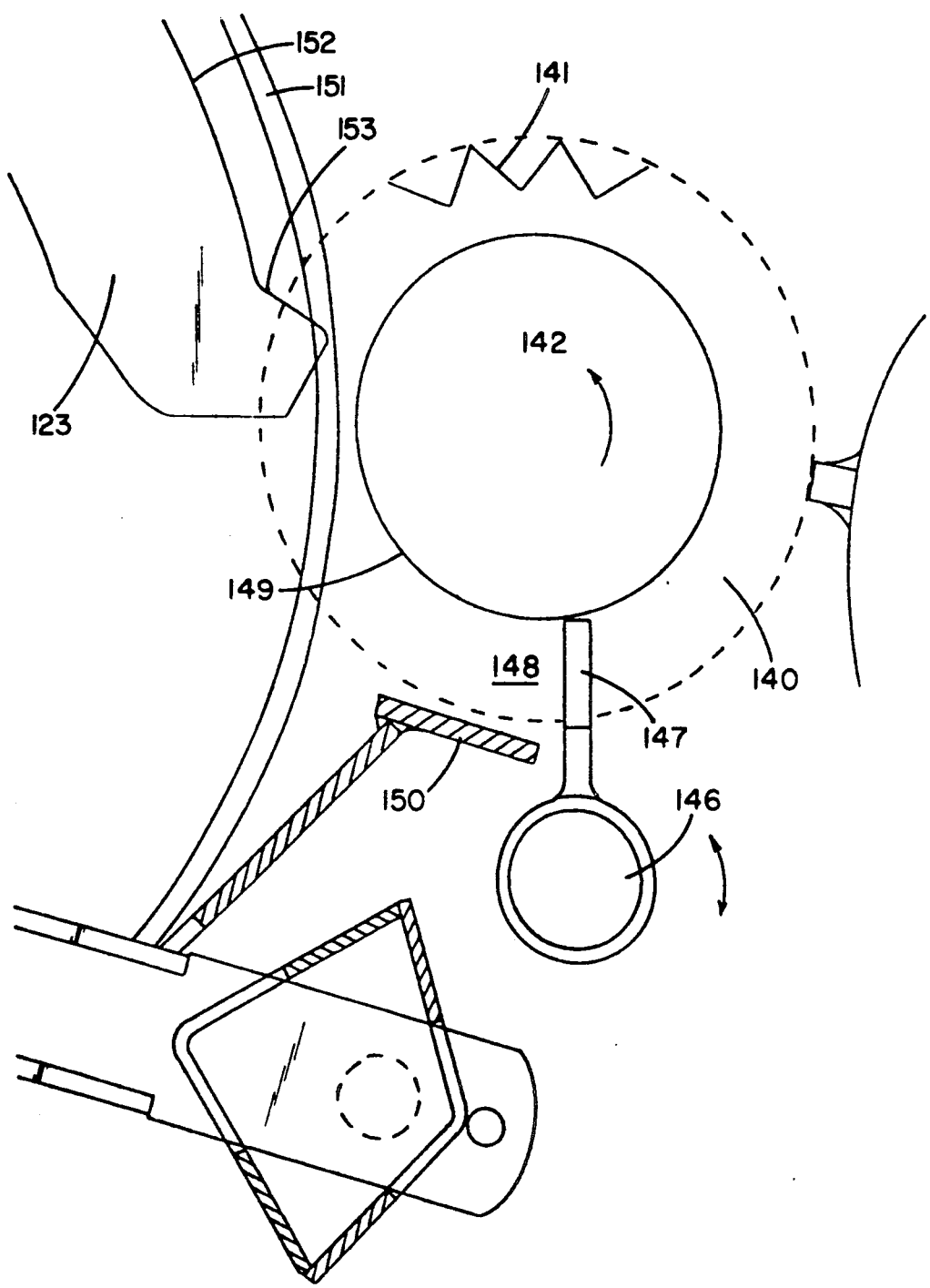
FIG. 6 is a detail view, to an enlarged scale, showing part of the device shown in FIG. 5.

However, to further minimise any tendency of unchopped bale material to pass along the underside of roller 140, a stripper device 146 is arranged in the path of the rotating projecting teeth 141, during movement along the lower part of their movement, as can be seen in FIG. 6. The stripper device 146 is formed by a series of stripper knives or blades 147 which are spaced apart along the length of the device 146, so as to engage in the spaces defined between successive axially spaced annular sets of toothed projections 141 arranged along the length of feed roller 140 (see FIG. 12).

The stripper device 146 is arranged to carry out angular reciprocatory motion, so as to apply progressive application of pressing force against any material which may tend to accumulate in a throat space 148 (see FIG. 6) which is defined between the under surface 149 of feed roller 140 and a guide plate 150. Guide plate 150 forms part of a lower wall 160 of housing 115, as can be seen from FIG. 5.

While the feed roller 140 has been shown with toothed type projections 141, it should be understood that many other types of projections may be provided, including tines and fingers. The arrangement of the feed roller is such that the bale chopper device 110 is capable of operating satisfactorily with round bales 121 of straw of hay, or silage, though it can also be used to chop long stem material supplied in loose form, or in other baled form, such as square or rectangular bales.

Figure 9:
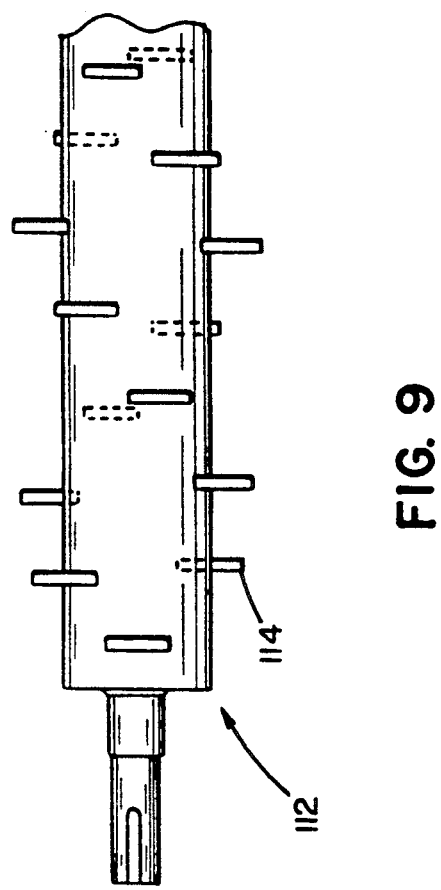
FIG. 9 is a front view of the elongate cutter body provided with sets of the flail type cutter blades arranged throughout its axial extent and circumferentially spaced apart from each other.
Figure 10:
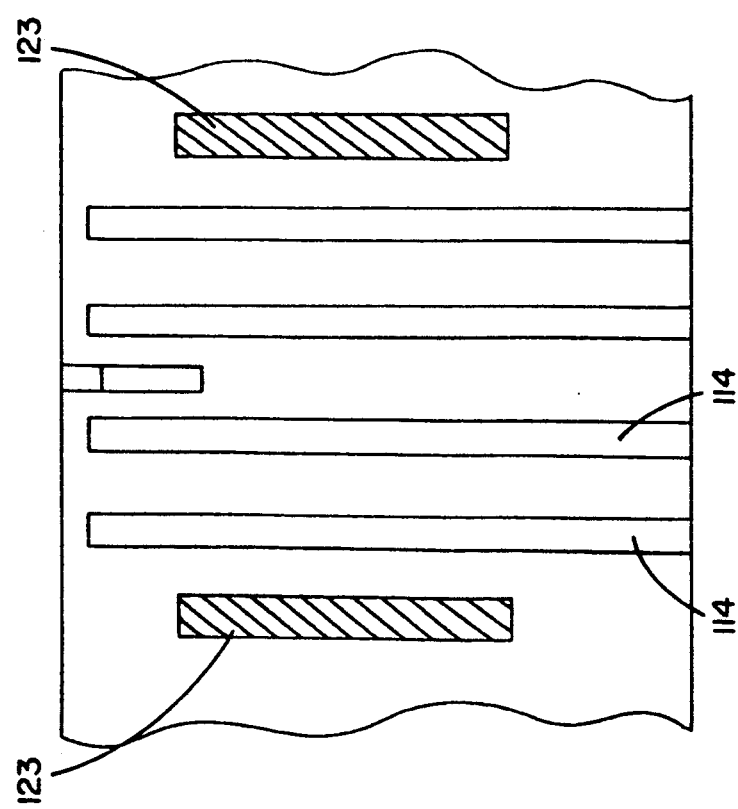
FIG. 10 is a detailed view showing the manner by which the cutter blades co-operate with a front mounted grill structure located in the path of the material which is being fed to the cutter blades.

To further improve the cutting action, over the first embodiment, a novel arrangement of flail type cutter blades 114 is arranged on the outer periphery of elongate cutter body 112, and the axial and circumferential distribution of these blades are shown in more detail in FIG. 9. It will be seen that the blades 114 are arranged in sets of blades which are circumferentially spaced from each other by 180°, but axially spaced from each other by only a very small amount. Each set of blades is therefore formed by two pairs of blades, and these blades are therefore able to co-operate both with the sides of the grill bars 123, as shown in FIG. 10, and with each side of the annular sets of projecting teeth 141 on the feed roller 140. The blades 114 are therefore able to carry out cutting or chopping action on the bale material, as well as stripping the sides of the grill bars 123 and the side faces of the annular toothed projection sets 141 to reduce the risk of bale material adhering thereto.

Figure 5:
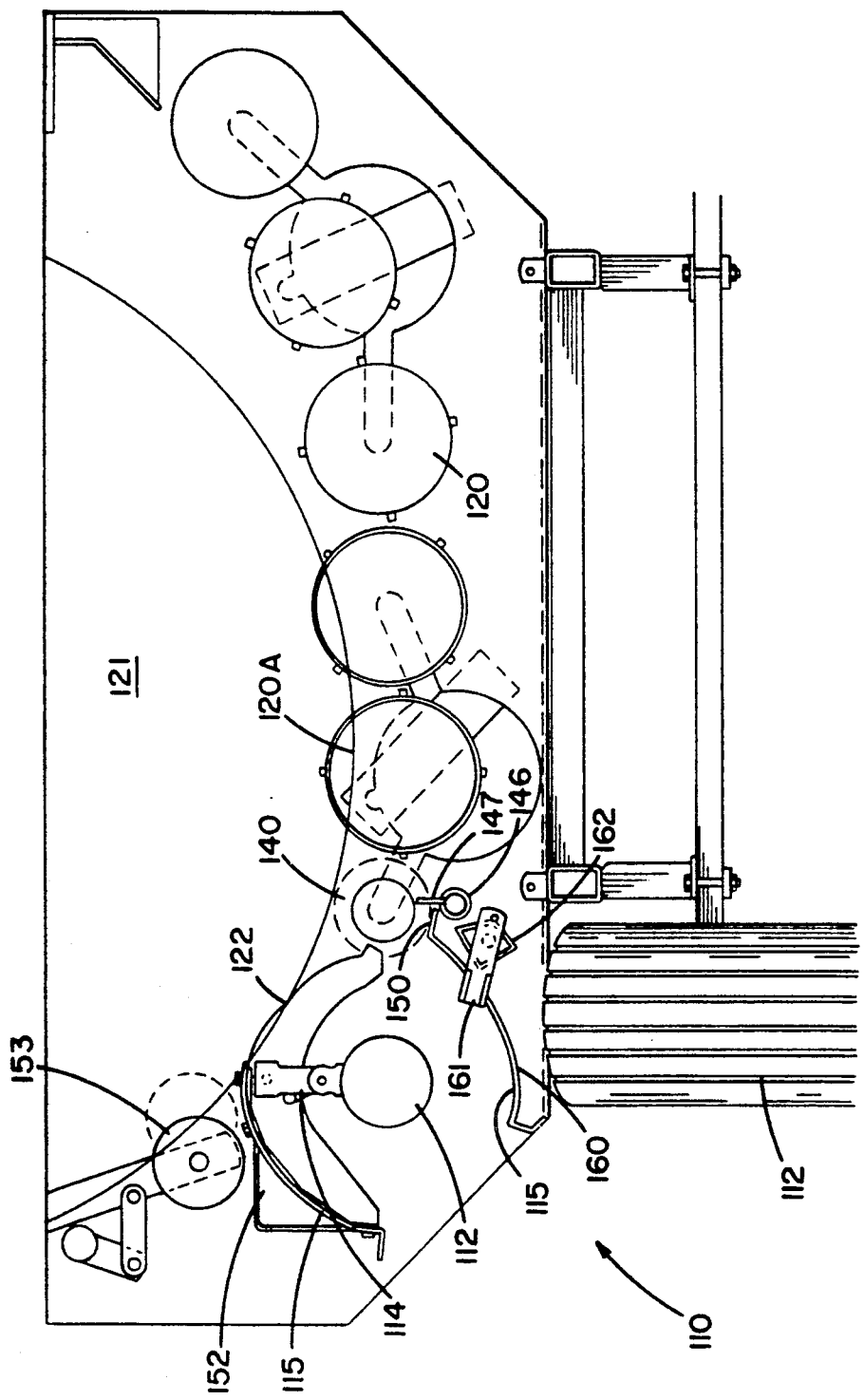
FIG. 5 is an end view, similar to FIG. 4, of a further embodiment of round-bale chopping device according to the invention.

As can be seen from FIG. 5, the "rake" of the grill 122 has been altered so as to extend generally along a line inclined at about 40° to the horizontal, and it has been found that this also assists in the engagement with the bale material and promotes smooth upward movement over the grill bars 123 while the rotating blades 114 progressively come into engagement with this material, as they follow the path shown by outline 151 in FIG. 6. The bale material is therefore drawn downwardly over the leading edge surfaces 152 of the grill bars 123, as shown in FIG. 6, and towards an inclined end 153, and as mentioned above, during this time the blade tips move along path 151, during which they project progressively by a greater radial extent beyond surfaces 152, as they come into engagement with the bale material.

Figure 8:
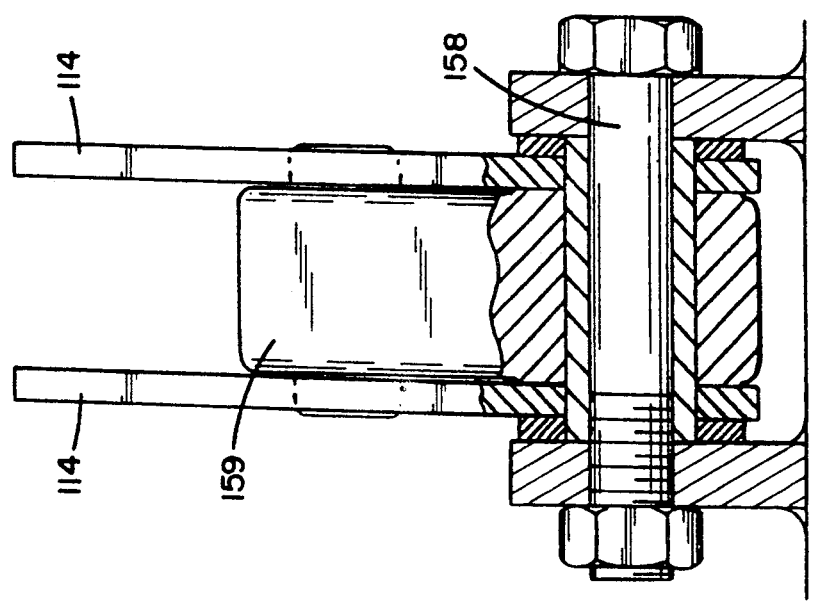
FIG. 8 is a detailed view, to an enlarged scale, showing a novel arrangement of flail-type cutter blades provided on the elongate cutter body.

To improve the chopping action, and especially in the case of dense masses of bale material which can arise when hay silage is being chopped, each dual arrangement of cutter blades 114 is pivotally mounted on a pivot 154, as shown in FIG. 8, and has a heavy mass 159 coupled therewith, to give the assembly substantial inertia. This enables substantial rotational energy to be stored in each pair of blades 114, during rotation of the cutter body 112, and therefore a strong chopping action can be carried out.

The sets of blades or knives (2 pairs of blades per set) are spaced apart at 90 mm, which is closer than in the first embodiment and, as seen in end view, there is 72° angular spacing between successive blade sets, with two blades in each set. As indicated above, one blade of each set cuts alongside the respective grill bar, whereas the other can co-operate with the side of the annular teeth set of the feed roller 140. However, as can be seen from FIG. 9, the corresponding blade set, spaced at 180° therefrom is slightly axially spaced therefrom, and therefore the blades thereof can co-operate with the opposite sides of the respective grill bars and annular blade sets.

In order to give further chopping or cutting action on any bale material which may pass downwardly into the region of the lower arcuate portion 160 of housing 115 (see FIG. 5), an additional set of chopper or cutter blades or teeth is provided, which are arranged axially spaced apart along the axis of cutter body 112. This additional set of cutter teeth is designated by reference 161, and these are mounted on a carrier 162 which can be linearly reciprocated between a position in which the blades 161 project through the wall 160 and into the path of the bale material, and a withdrawn position in which the tips of the blades 161 do not project beyond the housing wall 160.

In the chopping of dry straw material, it is necessary for the blades 161 to project through the wall 160 of the housing 115, in order to chop up the straw into required short lengths, typically about 60 mm, though preferably in the range 35 mm to 150 mm. If straw fed to cattle is too long, then the cattle do not feed properly, and are liable to toss the straw material about and trample it under foot.

The cutter body 112 will typically rotate at up to 2,000 revolutions per minute in the chopping of straw, but in the chopping of heavier and more dense bale material, particularly silage, rotation at about 1,400 revolutions per minute will be suitable.

It has been found that moist silage will be chopped up satisfactorily solely by the use of the rotating upper set of blades 114, and therefore the lower or bottom set of blades 161 must be withdrawn from the operative position shown in FIG. 5, to a withdrawn position in which they do not exert any cutting or chopping action on the silage as it passes along the wall 160.

Figure 12:
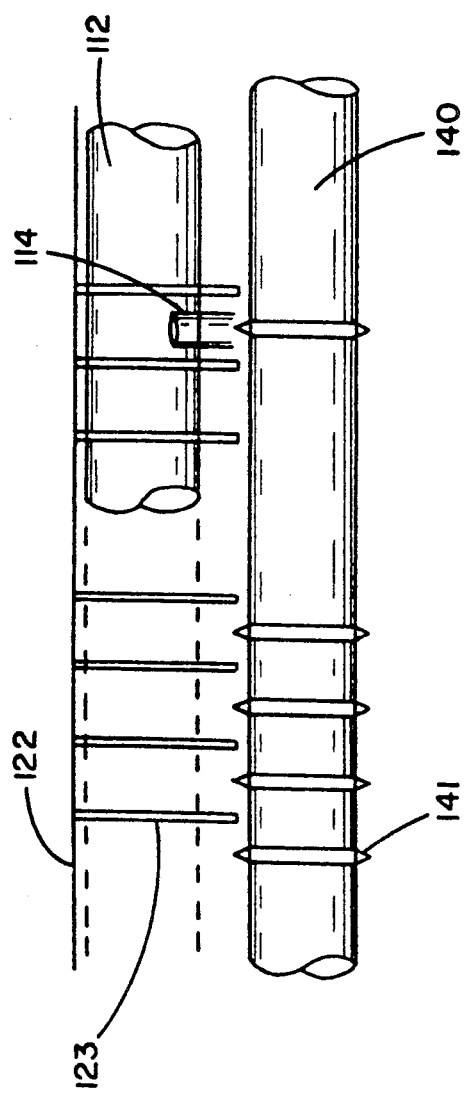
FIG. 12 is a schematic front view showing the cooperation between a feed roller, an elongate cutter body and a grill bar arrangement.

Referring now to FIG. 12 of the drawings, this shows a front view schematically of the co-operation between the feed roll 140, the elongate cutter body 112 and the grill 122. It can be seen that the feed roll 140 has axially spaced annular sets of tooth projections, which are each spaced between a respective pair of the grill bars 123 of the grill 122, and the manner of co-operation of the blade sets 114 can also be seen.

As mentioned above, there are blade sets circumferentially spaced apart around the circumference of the elongate cutter body 112 at angular spacings of 72°, and this, in combination with the slight axial spacing between successive blades sets, ensures that the blades can co-operate with the grill bars 123, and also with the sides of the annular toothed sets 141, in order to carry out both bale chopping operations, and also stripping along either side of each grill bar 123 to remove any adhering material, and also along both sides of each of the annular toothed sets 141.

Figure 7:
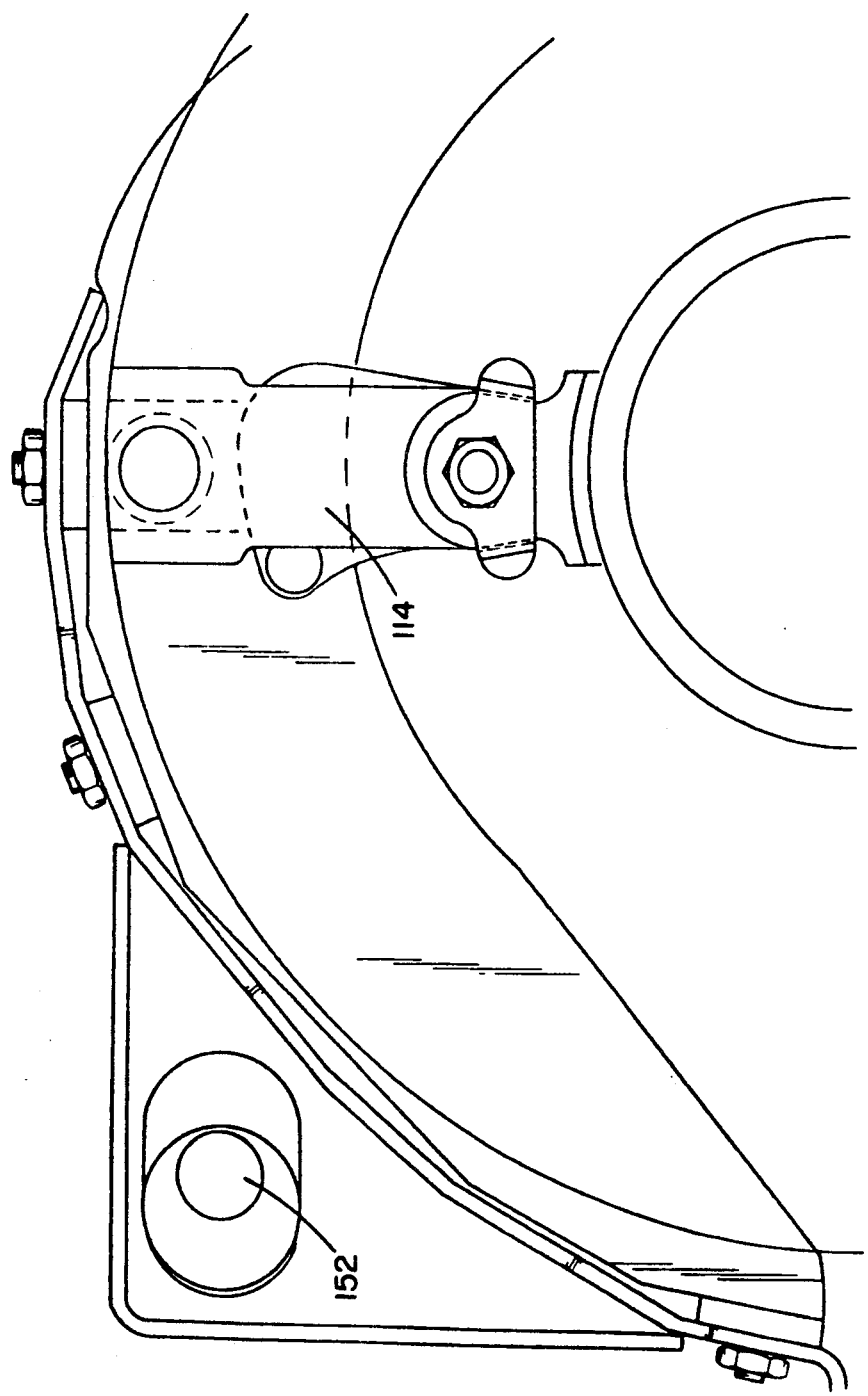
FIG. 7 is a side view, to an enlarged scale, of an elongate cutter body of the modified embodiment of FIG. 5.

To vary the extent of engagement of the ends of the rotating blade sets 114 i.e. to control the extent by which they project generally radially outwardly of the outer surfaces 152 (see FIG. 6), the entire grill arrangement 122 can be adjusted bodily about an eccentric mounting 152, shown in FIGS. 5 and 7.

Referring back to FIG. 5, a feed-control roller arrangement 153 is arranged above the grill 122, and is adjustable inwardly and outwardly relative to the bale 121 in order to compensate for the variation in diameter of the bale which takes place during operation as material is drawn from the outer periphery of the bale and then chopped-up.

Evidently, as the bale becomes smaller in size as material is torn from the outer periphery of the bale, the instantaneous centre of rotation of the bale will become lowered, and consequently there will be a need for the roller 153 to be adjusted outwardly to allow the outer periphery of the bale to maintain a required extent of engagement with the grill 122, so that the cutter blades can engage between the grill bars and into the bale periphery. Therefore, initially the roller 153 is adjusted inwardly to the position shown in dashed outline in FIG. 5 (when the bale has its greatest size), and then is moved progressively outwardly to the position shown in full lines as the bale reduces in size.

Figure 13:
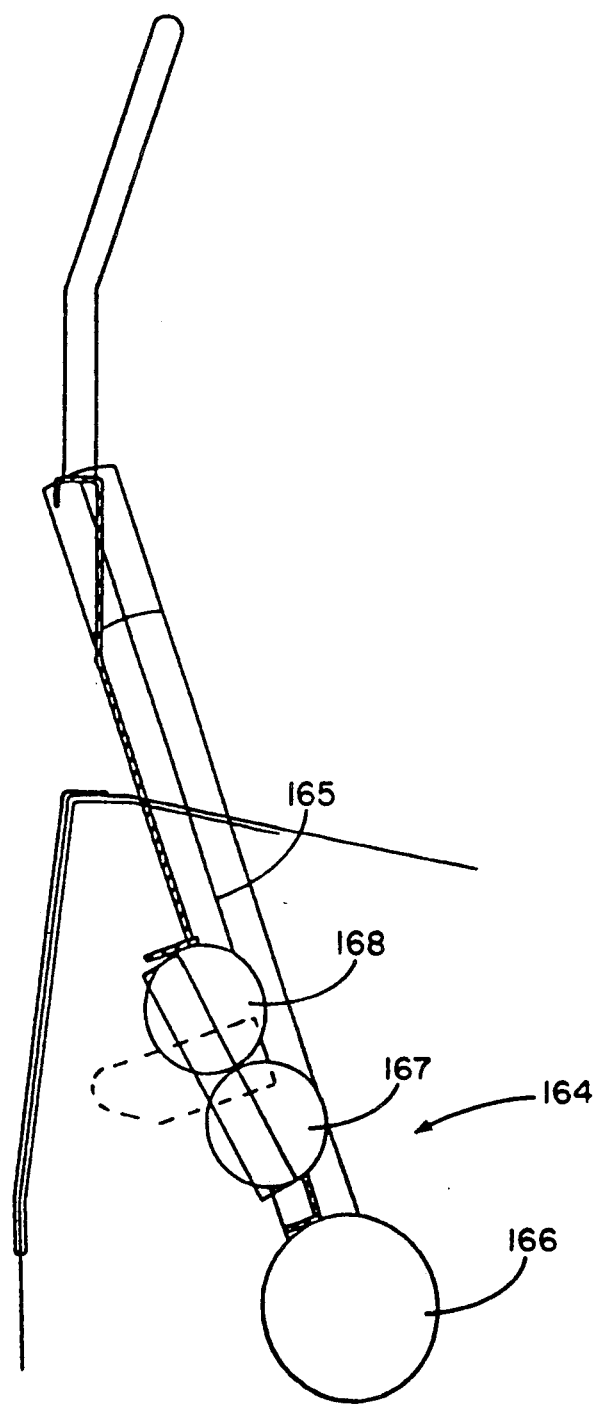
FIG. 13 is a detail view, to an enlarged scale, showing an alternative arrangement of control rollers to control the feeding of a bale to the rotary cutters as the bale reduces in size.

An alternative arrangement to the single control roller 153 of FIG. 5 is shown in FIG. 13. A set of feed control rollers 164 is carried by an adjustable support 165, and comprises a large lowermost control roller 166, and a co-operating pair of upper control rollers 167 and 168. The roller set 164 can be adjusted inwardly and outwardly to suit the instantaneous size of any particular bale, in order to control the feeding of the bale periphery to the grill 122 according to variations in height of the instantaneous centre of rotation of the bale, in similar manner to the adjustment of feed controller 163 of FIG. 5.

Figure 15:
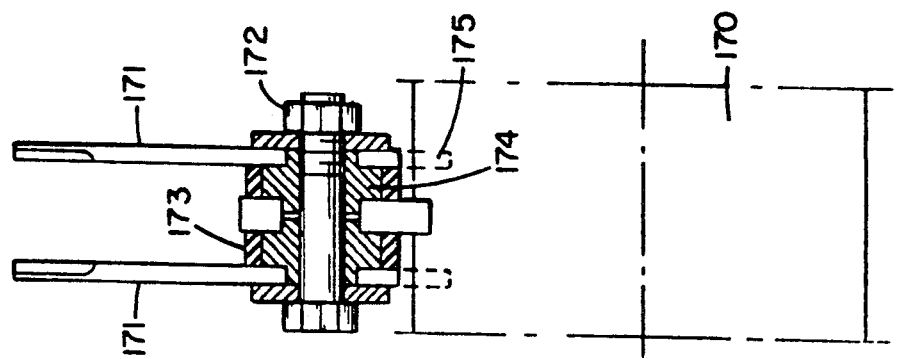
FIG. 15 is a side view of the cutter blades shown in FIG. 14.
Figure 14:
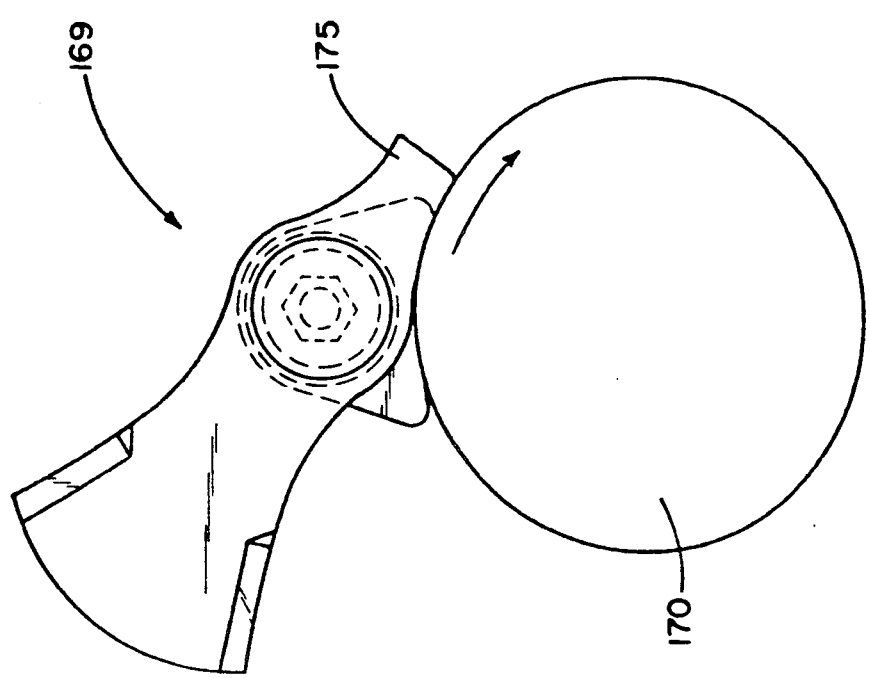
FIG. 14 is a detail end view, to an enlarged scale, of an alternative arrangement of rotary cutter blade.

FIG. 7 shows one construction of rotary cutter blade which can be used in the rotary chopper of the invention, and an alternative construction is shown in FIGS. 14 and 15. The alternative blade construction is designated generally by reference 169, and which is mounted on the outer periphery of rotary carrier drum 170. The blade structure 170 comprises a pair of blades 171 which are rigidly coupled together by means of a fastener 172 and a bush 173 made of resilient material. The bush 173 is secured to the outer periphery of a carrier sleeve 174 which is non-rotatably mounted, and this arrangement normally maintains the blades generally parallel to each other.

During rotation of the drum 170 in the direction of the arrow, the blades 171 adopt the position shown in FIG. 14, and it will be noted that the blades do not extend radially outwardly (as do the blades 114 of FIG. 7), but are rearwardly inclined with respect to the direction of rotation of the drum 170. It has been found that this gives an improved chopping action on the long stem material, and a large amount of rotational energy is stored in the blade arrangement 169 by virtue of its mass and inertia. The blades 171 will tend to rotate clockwise about the axis of fastener 172, but this will be restricted by engagement of the noses 175 of the blades with the outer periphery of drum 170. However, in the event of a severe impact with the blades 169 e.g. a stone or a dense mass of material, the blades can yield to a limited extent by pivoting in an anti-clockwise direction against frictional resistance provided by the bush 173. This reduces the risk of damage occurring, but continued rotation of the drum 170 causes the blades to return to the position shown under centrifugal action. The bush 173 therefore permits forced pivoting of the blades 171, both in a clockwise and anti-clockwise direction, but in such a way as to minimise the generation of clanking noises which occurs with the blade arrangement of FIG. 7.

Figure 16:
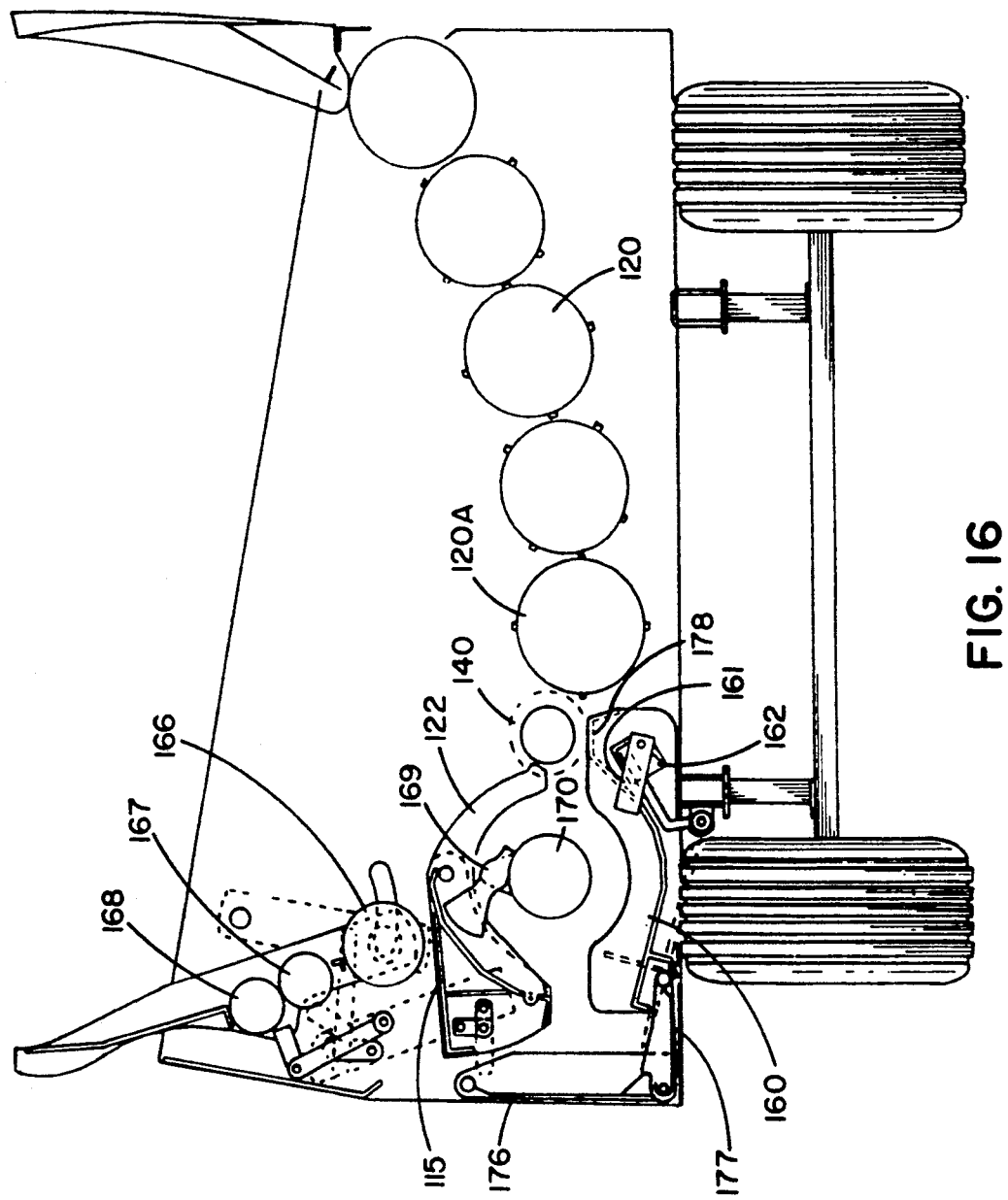
FIG. 16 is a view, similar to FIG. 5, of a further modification of the device; and, FIG. 17 is a schematic view of an alternative means for feeding the material to the rotary cutters.

Referring now to FIG. 16 of the drawings, this shows a view, similar to FIG. 5, of a modified arrangement for guiding the passage of chopped material along the underside of the rotating cutter body and the outlet. Parts corresponding with those which have already been described in the previous figures are designated by the same reference numerals, and will not be described in detail again.

Figure 11:
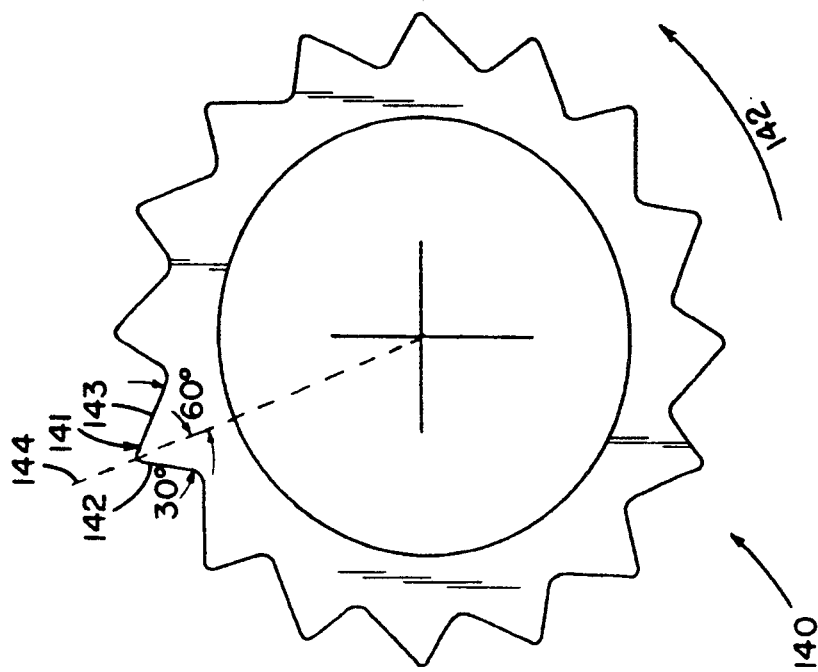
FIG. 11 is an end view of a feeder roller arranged immediately adjacent to an inlet through which the bale material is fed to receive a chopping or cutting action by the rotating elongate cutter body.

Embodiment of FIG. 16 includes the rotary carrier drum 170 having rotary cutter blades 169 which have been described in more detail with reference to FIGS. 14 and 15, and also includes the star toothed feed roller 140 which is shown in more detail in FIGS. 11 and 12. There is also provided the additional set of lower cutter teeth 161 mounted on a carrier 162, described with reference to FIG. 5, and which can be linearly reciprocated between a position in which the blades 161 project through the wall 160 and into the path of the chopped material, and a withdrawn position in which the tips of the blades 161 do not project beyond the housing wall 160. The cutter teeth 161 can be moved jointly between the two positions, according to the material which is being handled, and the material then is conveyed to an outlet which can be opened or closed by operation of a movable back plate 176. The back plate 176 is a hinged construction which can be pivoted outwardly, but has a lower portion 177 which can be used to direct the discharge of the chopped material e.g. downwardly into a cattle feeding trough.

The embodiment of FIG. 16 is generally similar to that shown in FIG. 5, but it has been found that the stripper device 146 can be omitted, provided that a minor adjustment is made in the shaping of the bottom housing wall 160, and its co-operation with the feed roller 140. Thus, as can be seen in FIG. 16, the housing wall 160 is shaped to have a flat platform portion 178 which is located immediately below the feed roller 140, and it has been found that this arrangement permits the bulk material to be engaged by the chopper blades 169 and chopped-up into smaller pieces, and then conveyed in a clockwise direction over the surface of the bottom wall 160 and to the outlet. There is a tendency for some material to be conveyed to the right over the platform 178 by the feed roller 140, but generally this comprises an acceptably low volume of material.

Figure 17:
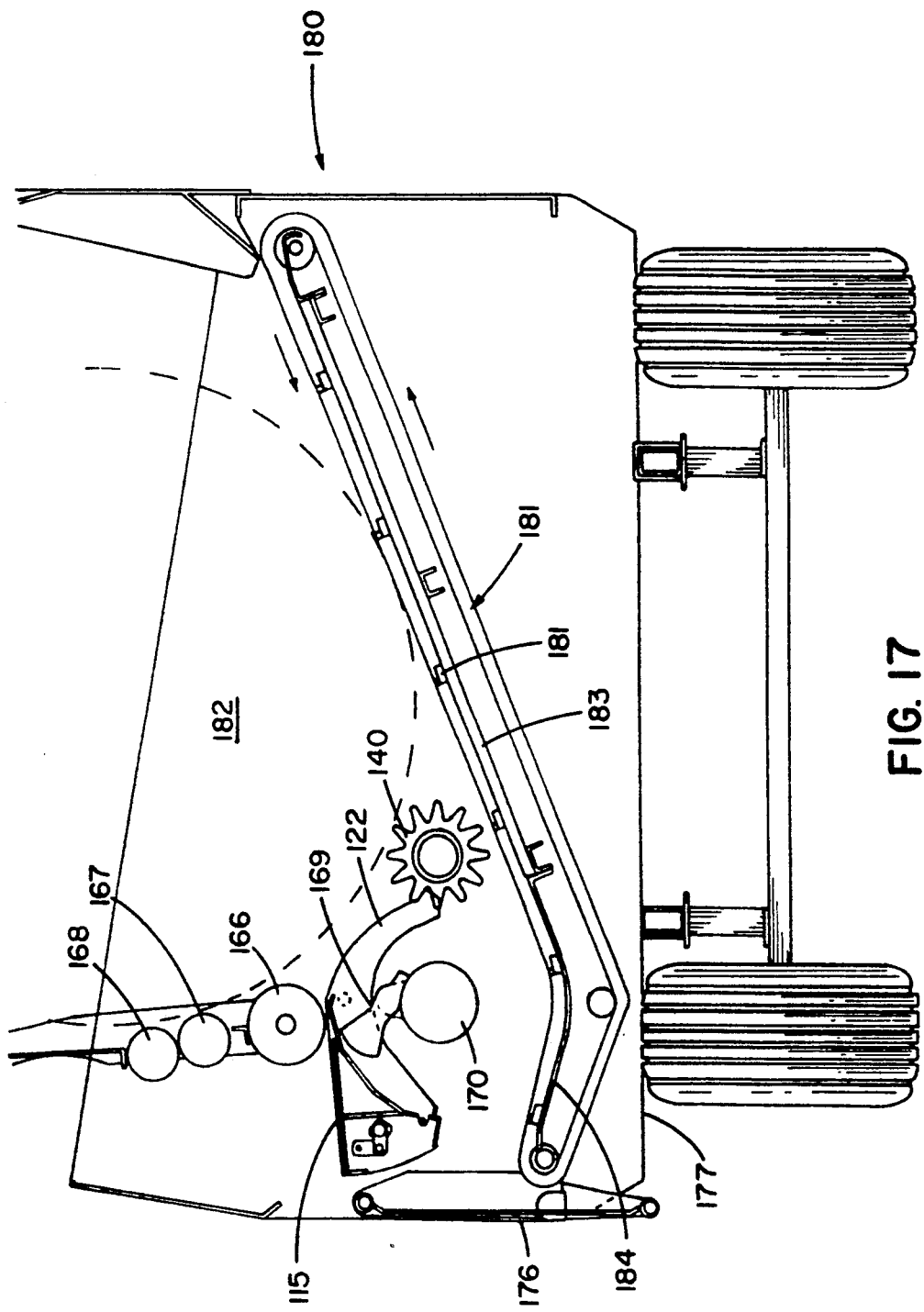

Finally, referring now to FIG. 17, a further modified embodiment is shown, having a different arrangement for feeding the bulk material to the rotating chopper blades. Parts corresponding with those already described are designated by the same reference numerals, and will not be described in detail again.

The embodiment shown in FIG. 17 is designated generally by reference 180, and has an alternative means for feeding the material, in that the rotating feed rollers 120 are replaced by an endless conveyor 181. It has been found that, in handling certain bulk materials, there can be a risk of unacceptable small amounts of material passing downwardly between adjacent rollers 120 and onto the ground, and requiring separate collection before being passed direct to the animals. The endless conveyor 181 has therefore been provided, which can convey the material to be acted upon by the rotary cutter 170, without any material falling downwardly onto the ground. The conveyor 181 is shown conveying a cylindrical bale 182 towards the rotary feed roller 140, the grill bars 122 and the rotary cutter 170. The runs of the conveyor 181 follow the direction of the arrows shown, and this conveys the bale 182 to the left, as shown in FIG. 17, and also imparts a clockwise rotation, which is assisted by the rotation of the feed roller 140. It should also be noted that the upper run of the conveyor 181 has two portions, namely a downwardly inclined portion 183 which feeds the material to the roller 140, and which then merges into a portion 184 which extends generally horizontally, but in fact gently upwardly. The portion 184 of the conveyor therefore forms a lower guide surface for conveying the material which is chopped-up by the rotating cutter blades 169 and to the outlet.

The endless conveyor 181 therefore performs a number of functions previously provided by a number of different components. Thus, it conveys the bulk material to receive the chopping action, and without any appreciable loss of material falling under gravity from the device, and also imparts the required generally clockwise rotation to the material. In addition, the lower end portion of the upper run of the conveyor forms a guide surface, and also a conveying surface for conveying the chopped-up material to the outlet. The endless conveyor 181 may be formed by a conveyor belt or band provided with slats 185.

We claim:

1. A device for chopping-up bulk material and comprising:
   a frame;
   an elongate cutter body mounted in said frame for rotation about a substantially horizontal axis;
   cutter blades mounted on the outer periphery of the cutter body;
   an elongate housing extending partly around said cutter body, said housing defining an inlet which extends substantially throughout the length of the cutter body to admit bulk material to be chopped and an outlet for discharging chopped up material after treatment by the blades of the rotating cutter body;
   a feeder device arranged on the frame and operable to support and to feed the bulk material to the housing inlet; and,
   a grill having an axis, and arranged at the inlet so as to control the supply of material to the cutter body;
   in which the grill comprises an arrangement of grill bars which are spaced apart so as to define spaces through which the cutter blades can move during rotation of the cutter body, the grill being pivotally mounted about the axis such that the extent by which the cutter blades project beyond the grill bars during rotation of the cutter body is adjustable during operation of the device, and in which the grill is mounted relative to the cutter body such that, in use, material is drawn downwardly over a leading edge surface of the bars prior to being chopped up.

2. A device according to claim 1 further comprising a pusher device mounted above the housing and operable to engage an upper region of the mass of material, the pusher device being arranged to apply a pushing action when required on the upper region of the mass of material tending to displace it in a direction away from the grill.

3. A device according to claim 1 further comprising a pusher device mounted above the housing and operable to engage an upper region of the mass of material, the pusher device being arranged to move so as to remain in contact with the upper region of the mass of material as the latter diminishes in size during treatment by the cutter body.

4. A device according to claim 1 wherein the bars of the grill each comprise a free end which is inclined relative to the remainder of the bar.

5. A device according to claim 1, in which the cutter blades are pivotally mounted at suitable locations throughout the outer periphery of the cutter body.

6. A device according to claim 5, in which the blades are mounted in sets of pairs of blades, each pair of blades being provided with a mass which is pivotable with the blades and in order to increase the inertia thereof.

7. A device according to claim 6, in which the blades extend radially outwardly under centrifugal action during rotation of the cutter body.

8. A device according to claim 6, in which the line of action of the blades extends substantially tangentially of the carrier body so that the cutter blades extend rearwardly with respect to the direction of rotation of the cutter body.

9. A device according to claim 8, in which the blades are pivotable against frictional action of an elastomeric bush.

10. A device according to claim 5, in which the axis of the cutter body is fixed.

11. A device according to claim 10, in which the grill bars form a unitary assembly which is adjustably mounted to allow adjustment different positions of adjustment relative to the housing inlet.

12. A device according to claim 11, including an eccentric mounting on which the assembly is mounted and about which the assembly can be adjusted in operation in order to vary the extent of engagement with a mass of material being chopped.

13. A device according to claim 12, in which the grill bar assembly takes the form of a plurality of curved fingers which extend downwardly from an upper edge of the housing inlet, and which are arranged to define a clearance between their lower ends ang a guide portion of the housing which extends below the cutter body and towards the outlet.

14. A device according to claim 2, in which the feeder device takes the form of an arrangement of feed rollers which can support a mass of material requiring chopping, and which are driven so as to convey the material towards the grill bars where the material is then held while being engaged by the cutter blades.

15. A device according to claim 14, in which the feed rollers are arranged to define a generally curved support surface onto which the lower part of a round bale can be supported and, upon driven rotation of the rollers, the bale can be caused to rotate about its axis while having its outer layer engaged by the cutter blades.

16. A device according to claim 15, including a bale pressing device mounted on the frame to engage the bale above the housing and operable to impart a pushing action on the bale tending to move the bale away from the grill bars.

17. A device according to claim 14, including a feed roll arranged adjacent to the inlet of the housing and provided with projections on its outer periphery to engage strands of the bale material and to feed these strands into the path of the blades.

18. A device according to claim 17, in which the projections take the form of sets of annular teeth axially spaced apart along the feed roll.

19. A device according to claim 18 in which the teeth of each annular set of teeth are triangular teeth having the leading edge of each tooth inclined at a smaller angle to a radial plane passing through the apex of the tooth than the inclination to the radial plane of the trailing edge of each tooth, with respect to the intended direction of rotation of the feed roll.

20. A device according to claim 1, in which the housing includes a lower wall along which the chopped material is caused to move, and a set of bottom blades is mounted in said wall.

21. A device according to claim 20, in which the bottom blades are adjustable between a projected position in the path of the chopped material and a withdrawn position.

22. A device according to claim 21, in which the lower wall of the housing forms a curved guide passage to the outlet, and includes a platform arranged below a feed roll arranged adjacent to the inlet of the housing and provided with projections on its outer periphery to engage the bulk material.

23. A device according to claim 1, in which a control feed roller arrangement is mounted above the grill land is movable inwardly and outwardly relative to the instantaneous centre of rotation of a bale undergoing chopping, in order to control the feeding of the outer periphery of the bale to the grill.

24. A device according to claim 23, in which the control feed roller arrangement comprises a set of rollers carried by an adjustment support.

25. A device according to claim 1, in which the feeder device comprises an endleess conveyor.

26. A device according to claim 25, in which the endless conveyor has a lower end portion which forms a guide surface extending under the rotating cutter body in order to guide chopped-up material to the outlet.

27. A device according to claim 26, in which the upper run of the conveyor includes an inclined portion which extends downwardly towards the feed roller and which merges into the portion which extends below the cutter body.

* * * * *